Patented Dec. 17, 1935

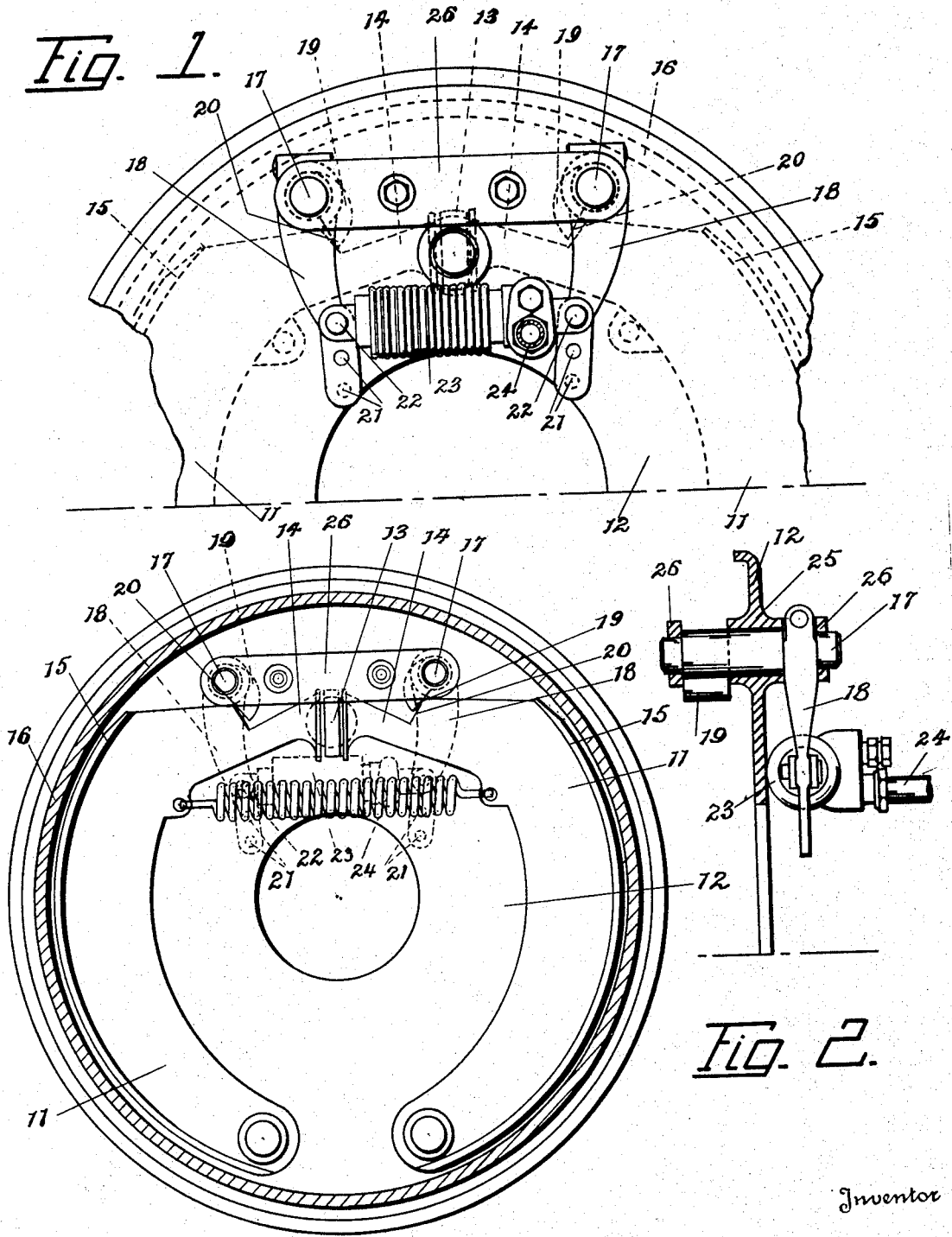

2,024,963

UNITED STATES PATENT OFFICE 2,024,963

BRAKE

Edward Bishop Boughton, London, England, assignor to Lockheed Hydraulic Brake Company Limited, London, England Application April 7, 1933, Serial No. 665,030
In Great Britain May 20, 1932

2 Claims. (Cl. 188—152)

This invention relates to brakes of the hydraulic type which are applied by forcing fluid under pressure into an expansible or telescopic cylinder, or equivalent cylinder and piston device, associated with the brake elements or shoes. In such brakes it is usual to employ an expansible cylinder or equivalent device which acts directly or through the medium of thrust rods upon the ends of the brake elements, said device being mounted upon the usual brake shoe carrying plate.

The object of the present invention is to provide improvements in brakes of the type referred to, and according to the invention an expansible cylinder, or any conventional motor means, co-operates at its ends with two levers, respectively, which in turn co-operate with two brake elements, respectively.

The operative lengths of the two levers may differ and may be chosen to suit any particular requirements; as, for example, when it is desired to apply a greater effort to one brake element than to the other in order that the braking effect of each may be equal. Again, in a given case, provision may be made for adjustment lengthwise of at least one of the levers of the point of attachment of the expansible cylinder or equivalent device thereto.

One form of the invention is illustrated by the accompanying drawing, of which:

Figure 1 is a view in elevation illustrating the application of the invention.

Figure 2 is an end elevation of the same with the backing plate in section.

Figure 3 is a view in elevation from the opposite side of the brake plate to that of Figure 1, the complete brake assembly being shown.

As shown, the invention is applied to a brake of the well-known kind, comprising two brake shoes (portions of which are indicated at 11) pivotally mounted each at one end, as shown in Figure 3, upon the usual brake shoe carrying plate, indicated at 12, and a mechanically operated cam 13 lying between the adjacent free ends 14, 14 of the shoes 11, 11, so that the latter may be moved outwardly about their pivots to bring the linings 15 thereof into co-operation with the brake drum indicated in dotted lines at 16.

As will be observed, the cam 13 is situated upon the brake plate 12 with its axis somewhat further from the periphery of said plate 12 than is normally the case, and at each side of this cam 13, and nearer to the periphery of the brake plate 12 are two fulcrum pins 17, 17, respectively, carrying each a lever 18 which extends inwardly towards the centre of the brake plate 12 at that side thereof remote from the shoes 11. At the inside of the brake plate 12, each of the fulcrum pins 17 is formed with an integral cam 19, the operative surface of which extends inwardly from the periphery of the brake plate 12 to co-operate with a step 20 formed at the outer part of the corresponding brake shoe 11 between the free end 14 of the latter and the corresponding end of the lining 15 thereof. The arrangement is such that when the two levers 18 are moved about their fulcrums away from one another, the fulcrum pin cams 19 will bear against the steps 20 of the respective brake shoes 11 and the linings 15 of the latter will be forced into contact with the brake drum 16.

Each lever 18, outside the brake shoe carrying plate 12 is formed with a number of apertures 21 to take a pin 22 for connecting therewith one end of a cylinder device 23 of known type, the interior of which latter is connected through a flexible coupling 24 of known type with a fluid pressure line (not shown) such as that of an ordinary hydraulic brake system. Thus, it will be seen that when fluid is forced into the cylinder 23, the levers 18 will be moved apart from one another and the brake will be applied. The effort applied in this way to the brake shoes 11 will depend upon the effective lengths of the two levers 18, and it will be seen that the effective lengths thereof may be adjusted each independently of the other to suit any particular requirements, according to the number of apertures 21 formed in each lever. In all cases, where the effective lengths are equal, equal effort will be applied to each brake shoe 11, but by making the effective length of one lever 18 greater than that of the other, different efforts can be applied, and this may be utilized to render the braking effects caused by what may be referred to as the "trailing" shoe which is usually less than that caused by what may be referred to as the "leading" shoe, to be increased until it is equal to, or greater than, that of said leading shoe.

The fulcrum pins 17 of the two levers 18 are journalled intermediately of their lengths in bearings 25 formed integrally with the brake shoe carrying plate 12, and, with a view to enabling these and their cams 19 to be made as light as possible, said pins 17 are interconnected at their free ends by tie bars 26 which effectively relieve said fulcrum pins 17 of all bending stresses and loads, and ensure that during the application of the brakes said pins 17 shall be subjected, so far as is possible, only to torsional stress.

Although in general it will be preferable to support the motor means of a brake according to the invention entirely by the levers which it serves to operate, such motor means may be otherwise conventionally supported in any appropriate or desired manner. Also, any known or convenient means may be provided according to the type of expansible cylinder, or equivalent device, which is employed in any particular case for connecting it operatively with said levers.

The arrangement of adjustable levers and floating motor means allows of quick and easy adjustment for obtaining any desired ratio of braking effort at any particular wheel or wheels.

What I claim is:

1. A brake of the type including a brake drum, brake shoes cooperating therewith and a brake shoe carrying plate, spindles mounted for rotation in the plate, cams carried by the spindles on one side of the plate to operatively influence the brake shoes in the movement of the spindles, levers carried by the spindles on the opposite side of the plate for actuating the spindles, motor means connected to the levers, and bracing means interconnecting the spindles beyond the cams in one direction and beyond the levers in the other direction.

2. A brake of the type including a brake drum, brake shoes cooperating therewith and a brake shoe carrying plate, spindles mounted for rotation in the plate, cams carried by the spindles on one side of the plate, shoulders formed in the brake shoes to be engaged by the cams in movement in one direction to operatively influence the brake shoes toward braking relation with the drum, levers carried by the spindles on the opposite side of the plate for actuating the spindles, motor means connected to the levers, a tie bar connecting the ends of the spindles adjacent to and beyond the cams, and a tie bar connecting the ends of the spindles adjacent to and beyond the levers, whereby distortion of the spindles in operation is effectively prevented.

EDWARD BISHOP BOUGHTON.